United States Patent Office.

JASPER NEWTON AND IRA BARFIELD, OF RICHLAND PARISH, LOUISIANA.

Letters Patent No. 99,464, dated February 1, 1870.

IMPROVED MEDICAL COMPOUND FOR CURE OF DROPSY.

The Schedule referred to in these Letters Patent and making part of the same.

*To all whom it may concern:*

Be it known that we, JASPER NEWTON and IRA BARFIELD, of the parish of Richland, in the State of Louisiana, have invented a new and useful Medical Compound for the Cure of Dropsy, whereof the following is a full and accurate description.

Our invention relates to the admixture of the juice or extract of the plant *Asclepias Syraiaca*, commonly known as the silk weed, with whiskey, or other alcoholic liquor, in the following manner and proportions:

We take the root of the silk weed, either green or dry, and extract therefrom the sap or juice by usual known means, or place it in the whiskey, or other alcoholic liquor, and allow it to remain therein for such space of time as will allow the sap to become extracted by, and intermixed with the whiskey, or other alcoholic liquor. The following proportions, or their equivalents, are to be used. To one quart of whiskey, use an admixture of one-half ounce of dried milk weed root; this will produce a correct sample of the medicine. If the extract of the green silk-root is used, the proportions should be one-quarter ounce of liquid extract of the root, to one quart of whiskey, or other alcoholic liquor.

If the liquid extract of the sap of the green root is used in combination with whiskey, or other alcoholic liquor, the medicine is ready for use at once; if the dry root is used, it should be allowed to remain in the whiskey, or other alcoholic liquor, for the period of four days.

What we claim as our invention, and desire to secure by Letters Patent, is—

A medical compound, containing whiskey, or other alcoholic liquor, in combination with the root, or the extract thereof, of the *Asclepias Syraiaca*, or silk-weed, when prepared as aforesaid, for the cure of dropsy or dropsical affections.

In testimony that we claim the foregoing medicine for the cure of dropsy, as above described, we have hereunto set our hands and seals, this 30th day of November, 1869.

J. NEWTON. [L. S.]
IRA BARFIELD. [L. S.]

Witnesses:
THOS. J. MANGHAM,
W. P. MANGHAM.